United States Patent
Li et al.

(10) Patent No.: US 9,837,838 B2
(45) Date of Patent: Dec. 5, 2017

(54) COLLECTING MODULE, NEW LEAD-ACID BATTERY, CHARGE AND DISCHARGE CONTROL DEVICE AND INTELLIGENT BATTERY

(71) Applicant: BSB Power Company Ltd, Shenzhen (CN)

(72) Inventors: Bingwen Li, Shenzhen (CN); Chao Yang, Shenzhen (CN); Zejun Peng, Shenzhen (CN); Yang Xiao, Shenzhen (CN); Wenqiang Zhi, Shenzhen (CN)

(73) Assignee: BSB POWER COMPANY LTD, Guangdong (CN)

( * ) Notice: Subject to any disclaimer, the term of this patent is extended or adjusted under 35 U.S.C. 154(b) by 0 days.

(21) Appl. No.: 15/302,975

(22) PCT Filed: Aug. 27, 2015

(86) PCT No.: PCT/CN2015/088229
§ 371 (c)(1),
(2) Date: Oct. 7, 2016

(87) PCT Pub. No.: WO2017/012173
PCT Pub. Date: Jan. 26, 2017

(65) Prior Publication Data
US 2017/0187207 A1   Jun. 29, 2017

(30) Foreign Application Priority Data

Jul. 21, 2015 (CN) .......................... 2015 1 0430245
Jul. 21, 2015 (CN) .......................... 2015 1 0431665
Jul. 21, 2015 (CN) .......................... 2015 1 0432556

(51) Int. Cl.
*H02J 7/00*   (2006.01)
*H01M 10/48*  (2006.01)
*H01M 10/12*  (2006.01)

(52) U.S. Cl.
CPC ......... *H02J 7/0031* (2013.01); *H01M 10/121* (2013.01); *H01M 10/486* (2013.01); *H02J 7/007* (2013.01); *H01M 2220/10* (2013.01)

(58) Field of Classification Search
CPC .... H02J 7/0031; H02J 7/0068; H01M 10/121; H01M 10/486
(Continued)

(56) References Cited

U.S. PATENT DOCUMENTS

2013/0113417 A1* 5/2013 Nakashima ........... H02J 7/0019
                                                    320/107
2017/0163068 A1* 6/2017 Li ......................... H02J 7/0068
2017/0261561 A1* 9/2017 Imamura ............ G01R 31/3624

FOREIGN PATENT DOCUMENTS

CN   201508885 U   6/2010
CN   103986195 A   8/2014
(Continued)

OTHER PUBLICATIONS

International Search Report for PCT/CN2015/088229 dated Mar. 16, 2016 and its English translation provided by Google Translate.
(Continued)

*Primary Examiner* — M'Baye Diao
(74) *Attorney, Agent, or Firm* — Ladas & Parry, LLP

(57) ABSTRACT

The present application provides a collecting module of a lead-acid battery and new lead-acid battery and the winding displacement is simpler when collecting the status parameters of the lead-acid battery by disposing the collecting module in the housing of the lead-acid battery and the security is improved when detecting. At the same time, the data storing unit of the collecting module not only stores the collected raw data of the battery at the time of shipment from the factory, but also stores the collected status parameters of the battery in use, which facilitates the subsequent comparison between the raw data and the status parameters, a more
(Continued)

accurate determining on the health status of the lead-acid battery and acquisition for the optimal maintenance of the lead-acid. Further, the internal temperature of the lead-acid battery can be more accurately collected by disposing the internal temperature acquisition unit in the lead-acid battery, and if the overheating of the battery occurs, it can be notified in time and dealt with, thus the scrapping of the battery is decreased and the power supply quality for the base station is improved.

4 Claims, 5 Drawing Sheets

(58) Field of Classification Search
USPC .......................................................... 320/134
See application file for complete search history.

(56) References Cited

FOREIGN PATENT DOCUMENTS

| CN | 104241704 A | 12/2014 |
|---|---|---|
| CN | 204927452 U | 12/2015 |
| JP | 200889417 A | 4/2008 |

OTHER PUBLICATIONS

Written Opinion of the International Search Authority for PCT/CN2015/088229 dated Mar. 16, 2016 and its English translation provided by Google Translate.

* cited by examiner

COLLECTING MODULE, NEW LEAD-ACID BATTERY, CHARGE AND DISCHARGE CONTROL DEVICE AND INTELLIGENT BATTERY

CROSS-REFERENCE TO RELATED APPLICATIONS

The present application is the U.S. national phase of PCT Application PCT/CN2015/088229 filed on Aug. 27, 2015, which claims the priorities of the Chinese patent applications Nos. 201510432556.2, 201510430245.2, and 201510431665.2 all filed on Jul. 21, 2015, which are incorporated herein by reference in their entireties.

FIELD OF TECHNOLOGY

The present invention relates to the field of battery technology, in particular to a collecting module, charge and discharge control device and battery device of a lead-acid battery.

BACKGROUND

Valve regulated lead battery is widely used in important places often as a backup power supply, such as electrical room, data room, mobile base station, etc. In recent years, the global market capacity of the valve regulated lead battery has reached a scale of above ten billion RMB one year.

It is necessary to monitor and maintain the valve regulated lead battery in many important places due to its large difference in running environment. Currently, there are two ways of monitoring and maintaining the storage battery in the industry:

The first is manual patrol, the engineering personnel arrives at the site, conducts the current, voltage, temperature and other tests of the storage battery and manually records the test and measure data at intervals (such as 3 months or 6 months). There are some disadvantages in the manual patrol: since many of the base stations are located in remote areas, the personnel and vehicle resource input are large, which is time-consuming and laborious; the personnel entry and exit management is strict because the electricity and room are important places, and there are potential failures in rooms when the personnel enters the room.

The second way is: setting the monitor system of storage battery, determining the real-time status of the storage battery by collecting the data of current, voltage and the temperature of running environment of storage battery and taking corresponding countermeasures. The method solves the disadvantage of manual patrol and obtains a certain effect to a certain extent. However, it also brings some new inconveniences: one is that the monitor cable is complicated in connection and easily interferes with the strong electric cable and even causes disconnection and short-circuit; the second is that the environmental temperature cannot truly reflect the usage status of the storage batter and the health status of the lead-acid battery cannot be accurately determined, which leads to being unable to scientifically perform maintenance and preservation.

In the prior art, the backup power supply of the communication base station often shows rapid decrease in capacity after about 2-3 years' using, thereby being forced to be scrapped ahead of time, which causes substantial loss of economy and environmental pollution. Alternatively, the storage battery runs in a low capacity, which shortens the time of backing up power of the base station, thereby influencing the communication service quality of base station and the hidden danger of communication interruption existing.

How to better maintain and lengthen the service life of the valve regulated lead battery is a problem that urgently needs to be solved in the current lead-acid battery industry.

SUMMARY

According to a first aspect, in one embodiment, a collecting module is provided, comprising:

a voltage acquisition unit, the voltage acquisition connected between the positive and negative electrodes of the lead-acid battery, used to collect the voltage value of the lead-acid battery;

a current acquisition unit, the current acquisition unit used to collect the current value of the lead-acid battery;

an internal temperature acquisition unit, the internal temperature acquisition unit used to collect the current value of the lead-acid battery; and a processor, the processor used to receive the voltage value of the lead-acid battery transmitted by the voltage acquisition unit, the current value transmitted by the current acquisition unit and the internal temperature transmitted by the internal temperature acquisition unit.

According to a second aspect, in one embodiment, a new lead-acid battery is provided, comprising: a housing and a body of lead-acid battery disposed in the housing, further comprising: a collecting module disposed in the housing, the collecting module is electrically connected with the body of the lead-acid battery, the collecting module comprising:

a voltage acquisition unit, the voltage acquisition connected between the positive and negative electrodes of the body of the lead-acid battery, used to collect the voltage value of the body of the lead-acid battery;

a current acquisition unit, the current acquisition unit used to collect the current value of the body of the lead-acid battery;

an internal temperature acquisition unit, the internal temperature acquisition unit used to collect the temperature of the body of the lead-acid battery; and a processor, the processor used to receive the voltage value of the body of the lead-acid battery transmitted by the voltage acquisition unit, the current value transmitted by the current acquisition unit and the temperature transmitted by the internal temperature acquisition unit.

According to a third aspect, one embodiment provides a charge and discharge control device, comprising: a servo module and a collecting module;

the collecting module comprising:

a voltage acquisition unit, the voltage acquisition connected between the positive and negative electrodes of the lead-acid battery, used to collect the voltage value of the lead-acid battery;

a current acquisition unit, used to collect the current value of the lead-acid battery;

an internal temperature acquisition unit, used to collect the internal temperature of the lead-acid battery; and a processor, the processor used to receive the voltage value, the current value and the internal temperature of the lead-acid battery and transmit the control instructions to the servo module;

wherein the servo module used to connect or disconnect the charge and discharge loop of the lead-acid battery.

One embodiment further provides another charge and discharge control device, used to control the intermittently charging of the lead-acid battery, comprising:

a voltage acquisition unit, used to collect the voltage of the lead-acid battery;

a current acquisition unit, used to collect the current of the lead-acid battery;

a temperature acquisition unit, disposed in the lead-acid battery, used to collect the temperature of the lead-acid battery;

a servo unit, used to connect and disconnect the charge and discharge loop of the lead-acid battery and feedback the on-off state of charge and discharge loop of the lead-acid battery; and a processor unit, electrically connected with the voltage acquisition unit, current acquisition unit, temperature acquisition unit and servo unit, the processor unit calculates the time of duration of connecting and disconnecting of the charge loop of the lead-acid battery according to the on-off state of the charge and discharge loop of the lead-acid battery fed back by the servo unit; the processor unit controls the servo unit to connect or disconnect the charge and discharge loop of the lead-acid battery according to the collected voltage, current, temperature and the on-off state of the charge and discharge loop of the lead-acid battery and the time of duration of the connecting and disconnecting of the charge loop fed back by the servo unit.

According to a fourth aspect, in an embodiment, an intelligent battery is provided, comprising: a housing and a body of the lead-acid battery disposed in the housing, wherein the housing is provided with a charge and discharge control device;

the charge and discharge control device is electrically connected with the body of the lead-acid battery, the charge and discharge control device comprises: a servo module and a collecting module; the collecting module comprises:

a voltage acquisition unit, the voltage acquisition connected between the positive and negative electrodes of the body of the lead-acid battery, used to collect the voltage value of the lead-acid battery;

a current acquisition unit, used to collect the current value of the body of the lead-acid battery;

an internal temperature acquisition unit, used to collect the temperature of the body of the lead-acid battery; and a processor, the processor used to receive the voltage, the current and the temperature of the lead-acid battery and transmit the control instructions to the servo module;

wherein the servo module used to connect or disconnect the charge and discharge loop of the body of the lead-acid battery.

The present application provides a collecting module of the lead-acid battery and new lead-acid battery, by disposing the collecting module in the housing of the lead-acid battery, one is allowing the winding displacement to be simpler when collecting the status parameters of the lead-acid battery and the security is improved when detecting. Another is that the data storing unit of the collecting module not only collects the collected raw data of the lead-acid battery at the time of shipment from the factory, but also collects the collected status parameters of the lead-acid battery in use, and the raw data of the data storage unit follows the lead-acid battery, which facilitates the subsequent comparison between the raw data and the status parameters, a more accurate determining on the real-time health status of the lead-acid battery and acquisition for the optimal maintenance of the lead-acid. Further, the internal temperature of the lead-acid battery can be more accurately collected by disposing the internal temperature acquisition unit in the lead-acid battery, and once the overheating of the battery occurs, the users can be notified in time and take actions, thus better maintain the lead-acid battery, decrease the scrapping of the battery and improve the power supply quality for the base station.

The charge and discharge control device and intelligent battery provided by the present application comprise the servo module and collecting module. The collecting module achieves the collecting and transmitting of various parameters of the lead-acid battery in use to allow the users to accurately master the status of the battery in real time. Moreover, the collecting module calculates the time of connecting and disconnecting of the battery according to the parameters of the battery and controls the servo module to perform the charge and discharge control on the lead-acid. Thus the loss of the lead-acid battery can be decreased by interrupting of restarting the charge and discharge of the lead-acid battery when the abnormal state of the lead-acid occurs. The collecting module and servo module finish the maintenance for the battery maintenance so that the battery is in operation state, which solves the hidden danger of backup power supply of the base station, efficiently lengthens the service life of the battery and decreases the environmental pollution.

Due to the charge and discharge control device disposed in the lead-acid battery, the charge and discharge control device provided by the present application not only can collect the internal temperature of the lead-acid battery, to better determine the use condition of the lead-acid battery by using the internal temperature of the lead-acid battery rather than the environmental temperature, also the wiring and winding displacement between the charge and discharge control device and the lead-acid battery are safe and simple; the charge and discharge control method and device collect the production and running (full life cycle) parameters, the parameters not only comprise the current and voltage, but also the internal temperature of the lead-acid battery and the time of duration of connecting and disconnecting the charge loop of the lead-acid battery, which realizes the convenient, safety and accurate monitoring for the current, voltage and internal temperature of the lead-acid battery, and controls the connecting or disconnecting of the charge loop according to the on-off state, the time of duration of the charge and discharge loop of the lead-acid battery, the collected voltage, current and temperature, thus efficiently maintains and preserve the lead-acid battery, avoids the long-term overcharge and high-temperature charge of the lead-acid battery and efficiently lengthens the service life of the lead-acid battery.

DESCRIPTION OF THE EMBODIMENTS

The present application will be further explained in detail in combination with the drawings and specific implementation below.

Embodiment 1

In the present application, a collecting module of a lead-acid battery and a new lead-acid battery are provided and the various parameters of the battery in use can be detected and transmitted in real time by the collecting module disposed in the lead-acid battery.

Figure 1:
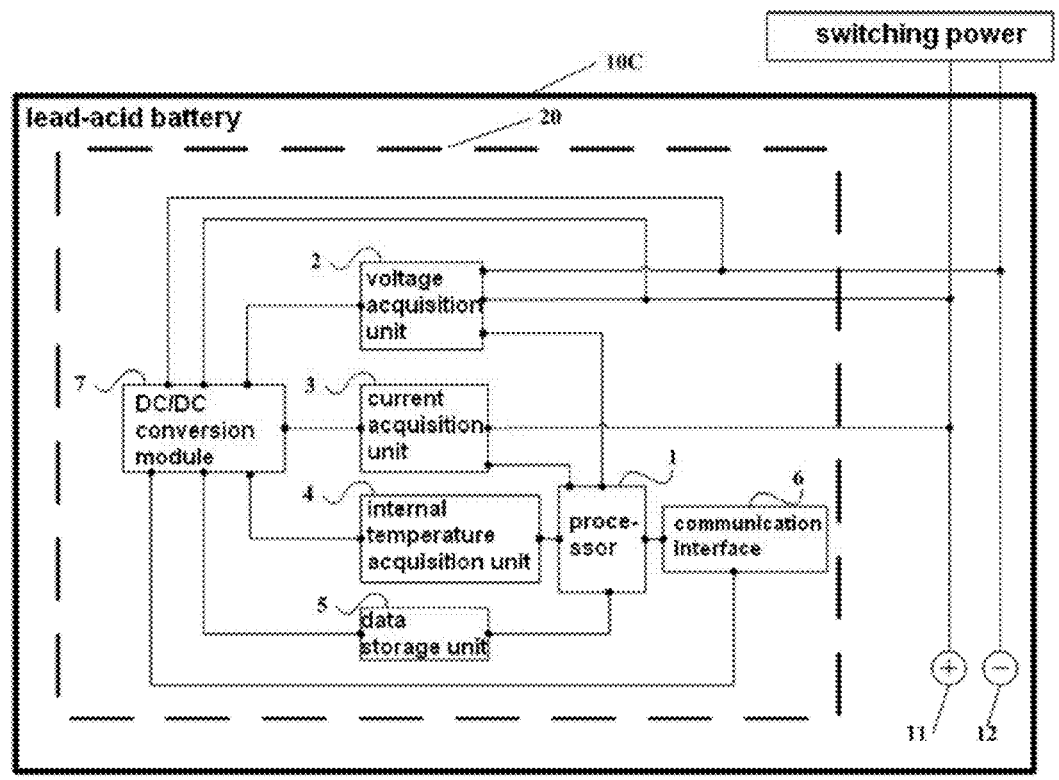
FIG. 1 is a structure diagram of a new lead-acid battery in one embodiment of the present application.

As shown in FIG. 1, the collecting module 20 of the lead-acid battery in the embodiment can comprise:

a processor 1 and a voltage acquisition unit 2 connected to the processor 1, a current acquisition unit 3 and an internal temperature acquisition unit 4.

The voltage acquisition unit 2 is connected to between positive and negative electrodes 11, 12 of the lead-acid battery 10C, used to collect the voltage value of the lead-acid battery 10C.

The current acquisition unit 3 is used to collect the current value of the lead-acid battery 10C.

The internal temperature acquisition unit 4 is used to collect the internal temperature of the lead-acid battery 10C.

The processor 1 is used to receive the voltage value of the lead-acid battery 10C transmitted by the voltage acquisition unit 2, the current value transmitted by the current acquisition 3 unit and the internal temperature transmitted by the internal temperature acquisition unit 4.

In a preferred embodiment, the collecting module 20 further comprises: a data storing unit 5, the data storing unit 5 is connected to the processor 1, used to store the raw data of the lead-acid battery at the time of shipment from the factory and the status parameters of the lead-acid battery in use output from the processor 1. The processor 1 receives the voltage value transmitted by the voltage acquisition unit 2, the current value transmitted by the current acquisition unit 3 and the internal temperature of the lead-acid battery transmitted by the internal temperature acquisition unit 4. The collecting module 20 is provide with the data storing unit 5, and the data storing unit 5 can receive and store the voltage value, current value and internal temperature transmitted by the processor 1, i.e. stores the status parameters of the lead-acid battery in use. At the same time, the data storing unit 5 stores the raw data of the lead-acid battery at the time of shipment from the factory. The processor 1 can acquire the raw data from the data storing unit 5, compare and estimate the raw data and the status parameters of the lead-acid battery in use to accurately acquire the SOC (State of Charge) and SOH (state of health) of the lead-acid battery.

The collecting module 20 of the present application further comprises: a communication interface 6 electrically connected with the processor 1. The collecting module 20 exchanges data with the outside through the communication interface 6. Preferably the communication interface 6 uses the RS485 interface. The processor 1 is connected to the external server device through the communication interface 6, to realize the data exchange between the collecting module 20 and the outside. The collected temperature value, voltage value and current value in the lead-acid battery are transmitted to the server device. Due to the collecting 20 produced and amounted integrally within the battery when producing the lead-acid battery, the processor 1 can acquire the internal temperature, voltage value and current value of the battery from producing to using and these raw data and status parameters are recorded. During the use of the battery, the users can invoke the external server to acquire the raw data of the battery when producing (raw internal temperature value, voltage value, and current value) and the status parameters of the battery in use (the real-time internal temperature value, voltage value, current value of the battery). By comparing and estimating the status parameters and raw data, thus the real-time status of the various lead-acid batteries can be more accurately determined, such as, whether the capacity of battery is too low to need changing, etc. i.e. the SOC and SOH of the lead-acid battery can be acquired. Thus the newest status and left service life of the battery can be conveniently and accurately acquired. Furthermore, the battery can be detected without manually conducting wiring and detachment operation. The detecting efficiency and the accuracy of the detecting are improved greatly and the damage to the battery is decreased.

In a preferred embodiment, the processor 1 is ARM processor.

In a preferred embodiment, the current acquisition unit 3 comprises a Hall sensor. The accuracy of collecting the current of the lead-acid battery is high and the error can be less than one percent.

In a preferred embodiment, the current acquisition unit 4 comprises a thermistor. When measuring the temperature of the battery, the resistance value of the thermistor varies as the internal temperature of the battery changes. At the same time, the temperature acquisition unit 4 converts the collected resistance value into voltage signal and transmits into the ARM processor. The collecting error of the temperature acquisition unit of the present application can be less than one percent with the high collecting accuracy, thus the data provided for the processor 1 is more accurate. In order to collect the internal temperature of the battery, the thermistor in the temperature acquisition unit 4 is disposed adjacent to negative plate of the battery on the middle cover of the lead-acid battery 10C.

In a preferred embodiment, the collecting module of the lead-acid battery further comprises: a DC/DC conversion module 7. The input of the DC/DC conversion module 7 is connected to the positive electrode 11 and negative electrode 12 of the lead-acid battery, the output is connected to the various units of the collecting module 20, used to convert the voltage of the lead-acid battery 10C into the operating voltage of the collecting module 20.

The output of the DC/DC conversion module 7 is connected to the voltage acquisition unit 2, current acquisition unit 3, internal temperature acquisition unit 4, data storing unit 5 and communication interface 6.

The lead-acid battery provided by the present application comprises a collecting module disposed in the housing of the battery, specifically comprises: a processor, a voltage acquisition, a current acquisition unit and a temperature acquisition unit connected to the processor, the voltage acquisition unit is respectively connected to the positive and negative electrode of the lead-acid battery, used to collect the voltage value of the battery and transmit to the processor. The current acquisition unit is used to collect the current value of the lead-acid and transmit to the processor, the temperature acquisition unit is used to collect the internal temperature of the lead-acid battery and transmit to the processor. The internal temperature, voltage value and current value of the battery in use can be collected by the processor and due to the processor connected to the external server device through the communication interface, the various electrical signal parameters can be transmitted to the outside to record, which is easy to compare and estimate, thus the SOC, SOH and left service life of the battery can be estimated in real time, the better maintenance for the battery can be conducted, the scrapping of the battery can be decreased and the power supply quality for the base station can be improved.

Embodiment 2

The present application further provides a new lead-acid battery, comprising: a housing (not shown in figures), a body of the lead-acid in the housing. Further comprising: a collecting module 20 disposed in the housing, the collecting module is electrically connected with the body of the lead-acid battery, the collecting module 20 comprises the processor 1 and voltage acquisition unit 2, current acquisition unit 3 and temperature acquisition unit 4 connected to the processor 1.

The current acquisition unit 2 is connected to between positive and negative electrodes 11, 12 of the lead-acid battery 10C, used to collect the voltage value of the body of the lead-acid battery.

The current acquisition unit 3 is used to collect the current value of the body of the lead-acid battery.

The internal temperature acquisition unit 4 is used to collect the temperature of the body of the lead-acid, i.e. the internal temperature of the new lead-acid battery.

The processor 1 is used to receive the voltage value of the body of the lead-acid battery transmitted by the voltage acquisition unit 2, the current value transmitted by the current acquisition unit 3 and the temperature transmitted by the internal temperature acquisition unit 4.

It should be noted that the lead-acid battery of the embodiment is a traditional lead-acid battery, used to complete the electrochemical reaction to provide energy for the battery. Also i.e. the lead-acid battery cell does not comprise the housing of the lead-acid battery.

In an embodiment, the collecting module 20 further comprises: a data storing unit 5, the data storing unit 5 is connected to the processor 1, used to store the raw data of the lead-acid battery at the time of shipment from the factory and the status parameters of the lead-acid battery in use output from the processor 1.

In a preferred embodiment, the housing comprises a shell and an upper cover, the shell is provided with a middle cover, the shell and the upper cover cover the middle cover inside.

The internal temperature acquisition unit 4 is disposed adjacent to the negative plate of the body of the lead-acid battery on the middle cover. Thus, the internal temperature acquisition unit 4 can collect the internal temperature of the new lead-acid battery in time, also i.e. the internal temperature of the body of the lead-acid battery. The users can master the temperature status inside the lead-acid battery in real time, once the overheating of the battery occurs, the users can take corresponding maintenance measures in time, thus better maintain the lead-acid battery.

In a preferred embodiment, the internal temperature acquisition unit 4 comprises a thermistor; the thermistor is disposed adjacent to the interior side of the body of the new lead-acid battery on the middle cover.

In a preferred embodiment, the collecting module 20 further comprises: a communication interface 6 electrically connected with the processor 1. The communication interface 6 is preferably the RS485 interface. The communication interface 6 is electrically connected with the processor 1 of the collecting module and the collecting module 20 exchanges data with the outside through the communication interface 6. The internal temperature, voltage value and current value of the lead-acid can be transmitted to outside trough the communication interface 6 and the users can master whether the internal temperature status, voltage and current of the lead-acid battery are normal or not in real time. When an abnormality occurs, protective measures can be taken in time to efficiently maintain the lead-acid battery, thereby lengthening the service life of the battery.

Embodiment 3

In the embodiment of the present application, a charge and discharge control device and intelligent battery are provided and the charge and discharge of the lead-acid battery can be controlled according to the collected battery parameters.

Figure 2:
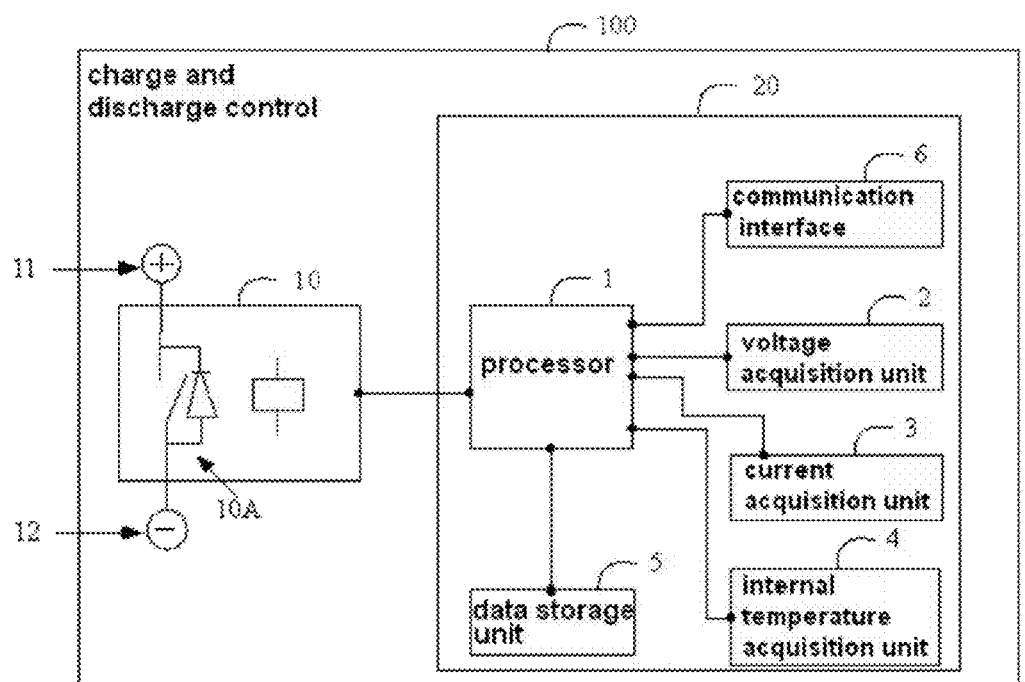
FIG. 2 is a structure diagram of a charge and discharge control device in one embodiment of the present application.

Please refer to FIG. 2, FIG. 2 is a structure diagram of a charge and discharge control device in an embodiment of the present application; As shown in FIG. 2, the charge and discharge control device 100 of the embodiment can comprise: a servo module 10 and a collecting module 20.

The collecting module 10 comprises:

a processor 1 and a voltage acquisition unit 2, a current acquisition unit 3 and an internal temperature acquisition unit 4 connected to the processor 1.

The current acquisition unit 2 is connected to between positive and negative electrodes 11, 12 of the lead-acid battery, used to collect the voltage value of the lead-acid battery. The current acquisition unit 3 is used to collect the current value of the lead-acid battery. The internal temperature acquisition unit 4 is used to collect the internal temperature of the lead-acid battery.

The processor 1 is used to receive the voltage value of the lead-acid battery transmitted by the voltage acquisition unit 2, the current value transmitted by the current acquisition unit 3 and the internal temperature transmitted by the internal temperature acquisition unit 4 and output control instructions to the servo module 10.

The servo is used to connect or disconnect the charge and discharge loop of the lead-acid battery.

Preferably, the servo module 10 is electrically connected with the processor 1 of the collecting module 20. The processor 1 is ARM processor. The processor 1 of the collecting module 20 can receives and processes the collected internal temperature, voltage value and current value of the lead-acid battery, determines the on-off state of the current charge loop and generates the control instructions and outputs to the servo module 10. The servo module 10 connects or disconnects the charge and discharge loop of the lead-acid according to the control instructions. Thus the charge and discharge control device 100 can control the charge and discharge of the lead-acid battery according to the collected battery parameters (voltage value, current value and internal temperature).

Preferably, the current acquisition unit 4 comprises: a thermistor. When measuring the temperature of the battery, the resistance value of the thermistor varies as the internal temperature of the battery changes. At the same time, the internal temperature acquisition unit 4 converts the collected temperature signal into corresponding voltage value and transmits into the ARM processor. The collecting error of the internal temperature acquisition unit 4 of the present application can be less than one percent with the high collecting accuracy, thus the data provided for the processor 1 are more accurate. In order to collect the internal temperature of the battery, the internal temperature acquisition unit 4 is disposed adjacent to the negative plate of the battery on the middle cover of the lead-acid battery, the middle cover of the battery is located inside the housing of the lead-acid battery, thus the temperature collected by the internal temperature acquisition unit 4 is the internal temperature of the battery and the temperature is more accurate and reflects the actual temperature of the lead-acid battery better, compared to the external temperature of the lead-acid battery collected in the prior art.

In a preferred embodiment, the collecting module 20 further comprises: a data storing unit 5, the data storing unit 5 is connected to the processor 1, used to store the raw data of the lead-acid battery at the time of shipment from the factory and the status parameters of the lead-acid battery in use transmitted from th processor 1. The processor 1 receives the voltage value transmitted by the voltage acquisition unit 2, the current value transmitted by the current acquisition unit 3 and the internal temperature transmitted by the internal temperature acquisition unit 4 and transmits to the data storing unit 5, and the data storing unit 5 can receives and stores the voltage value, current value and internal temperature transmitted by the processor 1, i.e. stores the status parameters of the lead-acid battery in use. At the same time, the data storing unit 5 stores the raw data of the lead-acid battery at the time of shipment from the factory. The processor 1 can acquire the raw data from the data storing unit 5, compare and estimate the raw data and the status parameters of the lead-acid battery in use to accurately acquire the SOC (State of Charge) and SOH (state of health) of the lead-acid battery.

Preferably, the current acquisition unit 3 comprises: a Hall sensor. The accuracy of collecting the current of the battery is high and the error can be less than one percent.

In a preferred embodiment, the collecting module 20 further comprises: an communication interface connected to the processor 1, the collecting module 20 exchanges data with the outside through the communication interface 6.

The communication interface 6 preferably uses the RS485 interface. It should be understood that the collecting module 20 can transmit the collected voltage value, current value and internal temperature of the lead-acid battery to external server (such as gateway module) through the communication interface 6 to be recorded therein, and invoked when required. Also can receive the instructions input by external through the communication interface 6 and transmit the instructions to the servo module 10 to control the charge and discharge of the lead-acid battery. For example, the users can also transmit the instructions to the collecting module 20 through the communication interface 6 and transmit to the servo module 10 to control the charge and discharge of the lead-acid battery by connecting and disconnecting the charge and discharge loop of the lead-acid by the servo module 10.

Embodiment 4

Figure 3:
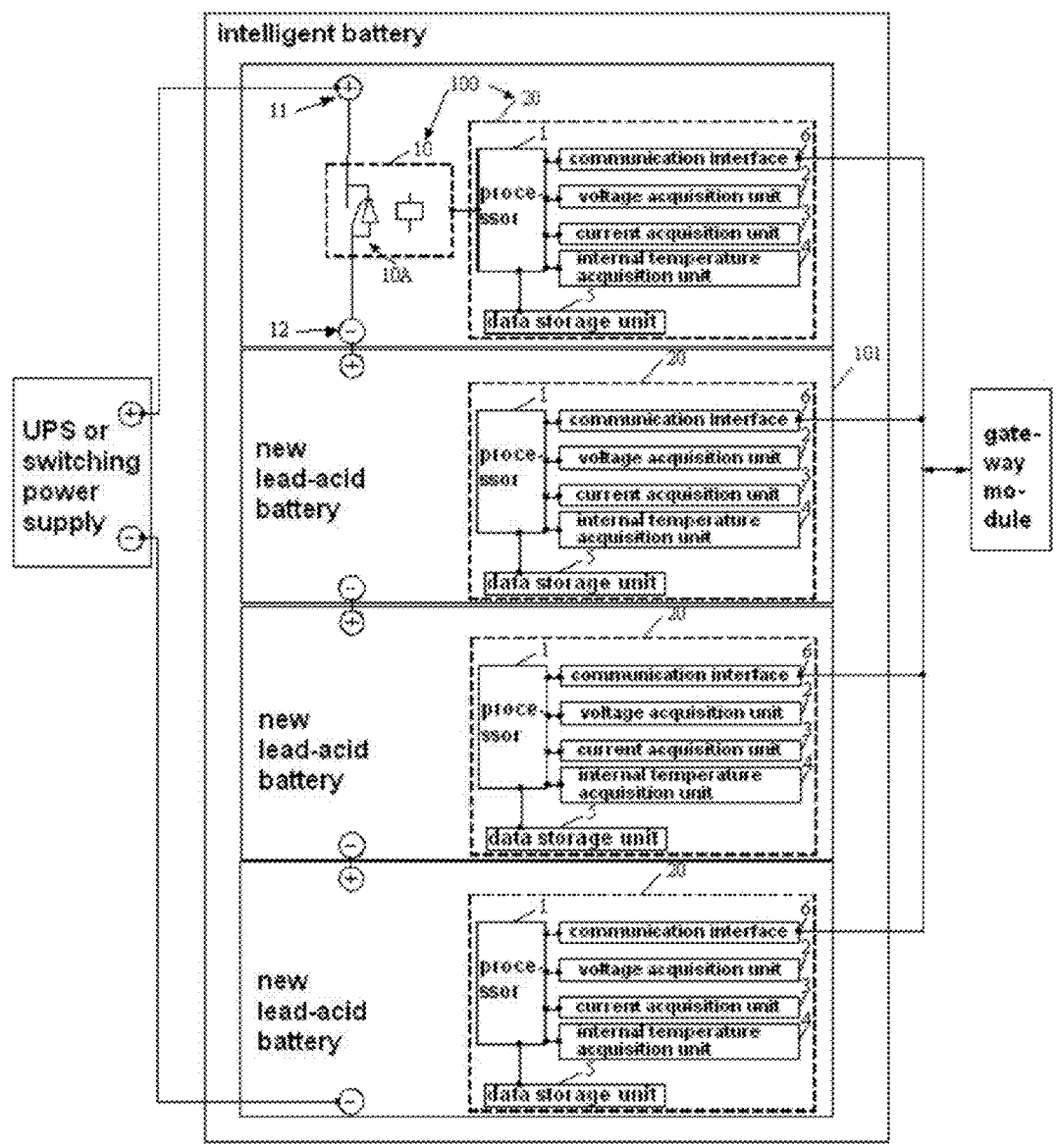
FIG. 3 is a structure diagram of an intelligent battery in one embodiment of the present application.

As shown in FIG. 3, the embodiment provides an intelligent battery, comprising: a housing (not shown in figures), a body of the lead-acid battery disposed in the housing. Wherein, the intelligent battery further comprises: a charge and discharge control device 100 disposed in the housing, the body of the lead-acid battery is electrically connected with the charge and discharge control device 100.

The structure of the charge and discharge control device 100 is basically same as the embodiment 3 thereof, the charge and discharge control device 100 comprises: a servo module 10 and collecting module 20. The collecting module 20 comprises: a processor 1 and a voltage acquisition unit 2, a current acquisition unit 3 and an internal temperature acquisition unit 4 connected to the processor 1.

The current acquisition unit 2 is connected to between positive and negative electrodes 11, 12 of the body of the lead-acid battery, used to collect the voltage value of the body of the lead-acid battery. The current acquisition unit 3 is used to collect the current value of the body of the lead-acid battery. The internal temperature acquisition unit 4 is used to collect the temperature of the body of the lead-acid battery.

The processor 1 is used to receive the voltage value of the body of the lead-acid battery transmitted by the voltage acquisition unit 2, the current value transmitted by the current acquisition unit 3 and the internal temperature transmitted by the internal temperature acquisition unit 4 and output control instructions to the servo module 10.

The servo module 10 is used to connect or disconnect the charge and discharge loop of the lead-acid.

As the same principle as in embodiment 3, the servo module 10 receives the control instructions output by the collecting module 20 on the intelligent battery and connects and disconnects the charge and discharge loop of the intelligent battery under the control of the collecting module 20 to complete the control over the charge and discharge of the intelligent.

Due to disposed inside the housing, the charge and discharge control device 100 is electrically connected with the body of the lead-acid battery. The charge and discharge control device 100 herein is used to control the servo module 10 to connect or disconnect the charge and discharge loop of the body of the lead-acid battery according to the battery parameters of the body of the lead-acid battery (the voltage value, current value and temperature of the body of the lead-acid battery) collected by the collecting module 20.

It should be noted that the lead-acid battery described in the embodiment is a traditional lead-acid battery, used to complete the electrochemical reaction to provide energy for the battery. The housing of the lead-acid battery is not included, but an electrolyte, a positive electrode plate and a power supply cell protruding through the post terminal outside the housing are included. The shown positive electrode 11 and negative electrode 12 in the figure represent the body of the lead-acid battery.

Preferably, the internal temperature acquisition unit 4 comprises a thermistor; the thermistor is disposed adjacent to the interior side of the body of the lead-acid battery on the middle cover inside the housing. It should be further noted that, in the embodiment, the charge and discharge control device 100 is used to collect the parameters of the intelligent battery and control the charge and discharge of the intelligent battery according to these parameters. It should be particularly noted that, due to the charge and discharge control device 100 disposed inside the housing, the internal temperature acquisition unit 4 specifically uses the thermistor to collect the internal temperature of the intelligent battery, also i.e. in the embodiment, the temperature collected by the internal temperature acquisition unit 4 is the temperature of the body of the lead-acid battery.

In an embodiment, the intelligent battery further comprises: at least one new lead-acid battery 100 electrically connected with the body of the lead-acid battery, the new lead-acid battery 101 comprises a body of the lead-acid and a collecting module 20. The composition, connection relation and function of the collecting module 20 of the new lead-acid battery 101 is the same as the above collecting module, and are not repeatedly described.

The number of the new lead-acid battery 101 is greater than or equal to two. The new lead-acid batteries are connected in series.

The collecting module 20 further comprises: a data storing unit 5, the data storing unit 5 is connected to the processor 1, used to store the raw data of the lead-acid battery at the time of shipment from the factory and the status parameters of the lead-acid battery in use output from the processor. The principle of the data storing unit 5 is the same as the embodiment 1, and is not repeatedly described.

Wherein, the servo module 10 of the charge and discharge control device 100 comprises freewheeling diode 10A. The positive electrode of the freewheeling diode 10A is connected to the negative electrode 12 of the body of the lead-acid battery; the negative electrode of the freewheeling diode 10A is connected to the positive electrode 11 of the body of the lead-acid. The intelligent battery is connected to the external UPS power (uninterruptible Power System) or the switching power. When the external Ac is disconnected, the freewheeling diode 10A in the servo module 10 is immediately on, instantly connects the loop of the battery to supply power for the UPS or the switching power and other user devices and feeds back the on-off state of the loop in real time. At the same time, the intelligent function of the high temperature and disconnecting automatic control and human intervention are supported.

In a preferred embodiment, the processor 1 of the at least one new lead-acid battery 101 in the intelligent battery also can be connected to the gateway module though the communication interface 6, can upload the battery parameters though the communication interface 6 in real time and record them on the external devices. Thus, the electrical signal parameters of the lead-acid battery in use can be stored and invoked. Once it is founded that the abnormality occurs in the electrical signal fed back by the collecting module 20 of the new lead-acid battery 101, such as, the common float charging of the battery, the collecting module 20 controls the servo module 10 to interrupt the charging of the lead-acid battery, further efficiently protects the battery and lengthens the service life of the battery. In another implementation, the users also can input the instructions through the communication interface 6, then transmitted to the servo module 10 by the collecting module 20, the charge and discharge of the at least one new lead-acid battery 101 and the intelligent battery are directly controlled by the servo module 10.

The charge and discharge control device and intelligent battery provided by the present application comprise the servo module and collecting module. The collecting module achieves the collecting and transmitting of various parameters of the lead-acid battery in use to allow the users to accurately master the status of the battery in real time. Moreover, the collecting module calculates the time of on-off of the battery according to the battery parameters and controls the servo module to control the charge and discharge of the lead-acid battery. Thus the loss of the lead-acid battery can be decreased by interrupting of restarting the charge and discharge of the lead-acid battery when the abnormal state of the lead-acid occurs. The collecting module and servo module finish the maintenance for the battery maintenance so that the battery is in operation environment or state, which solves the hidden danger of backup power supply of the base station, efficiently lengthens the service life of the battery and decreases the environmental pollution.

Embodiment 5

Figure 4:
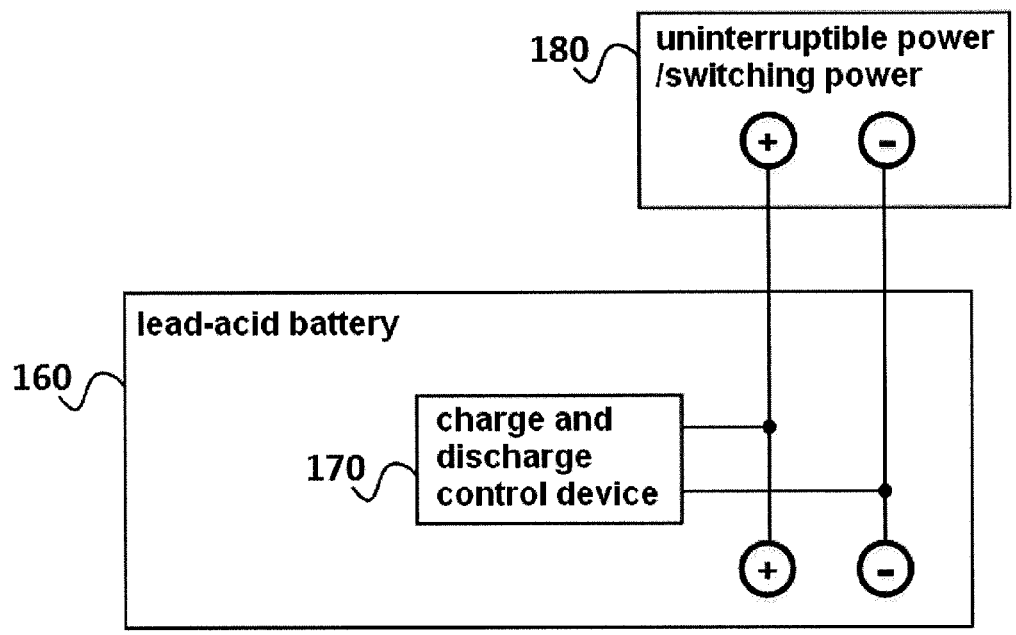
FIG. 4 is a structure diagram of an intelligent battery in another embodiment of the present application.

Please refer to FIG. 4, the present application provides an intelligent battery, comprising a lead-acid battery 160 and a charge and discharge control device 170. The lead-acid battery 160 is used to supply power for the UPS power or the switching power 180 as a backup power supply when the AC is disconnected. The charge and discharge control device 170 is disposed in the lead-acid battery 160 to collect the parameters of the lead-acid battery 160 in running, the parameters not only comprise the current and voltage, also the internal temperature of the lead-acid battery 160 and the time of duration of charge and discharge of the lead-acid battery 160. Compared to the traditional monitor system of storage battery, due to the charge and discharge control device 170 disposed in the lead-acid battery 160, the wiring and winding displacement thereof are not complicated and the outer power supply line cannot be interfered, at the same time, the temperature of the lead-acid battery 160 can be detected accurately without determining the use condition of the lead-acid battery 160 by using the environmental temperature like in the prior art.

Figure 5:
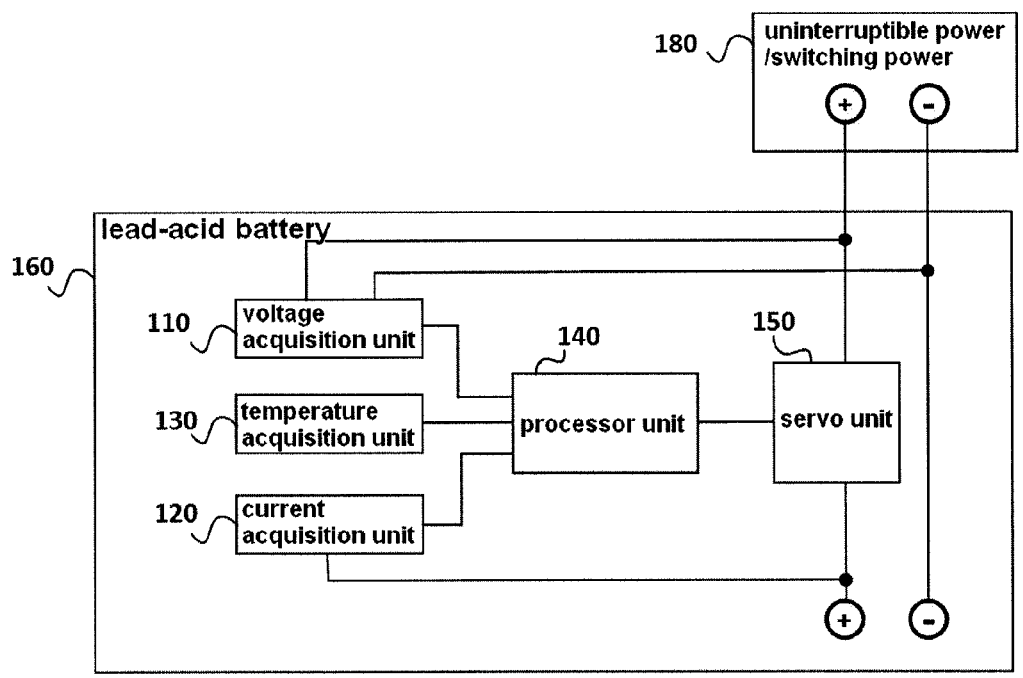
FIG. 5 is a schematic of an intelligent battery in still another embodiment of the present application.

Please refer to FIG. 5, the charge and discharge control device 170 determines the real-time status of the lead-acid battery 160 by collecting the current, voltage, internal temperature and time of the charge and discharge of the lead-acid battery 160, and takes the corresponding actions to control the connecting or disconnecting of the charge and discharge loop of the lead-acid battery 160, thus avoids the long-term overcharge and high-temperature charge of the lead-acid battery 160 and efficiently lengthens the service life of the lead-acid battery 160 from the traditional 2-3 years to at least 6-9 years.

In a detailed embodiment, the charge and discharge control device 170 comprises a voltage acquisition unit 110, a current acquisition unit 120, a temperature acquisition unit 130, a processor unit 140 and a servo unit 150.

Figure 6:
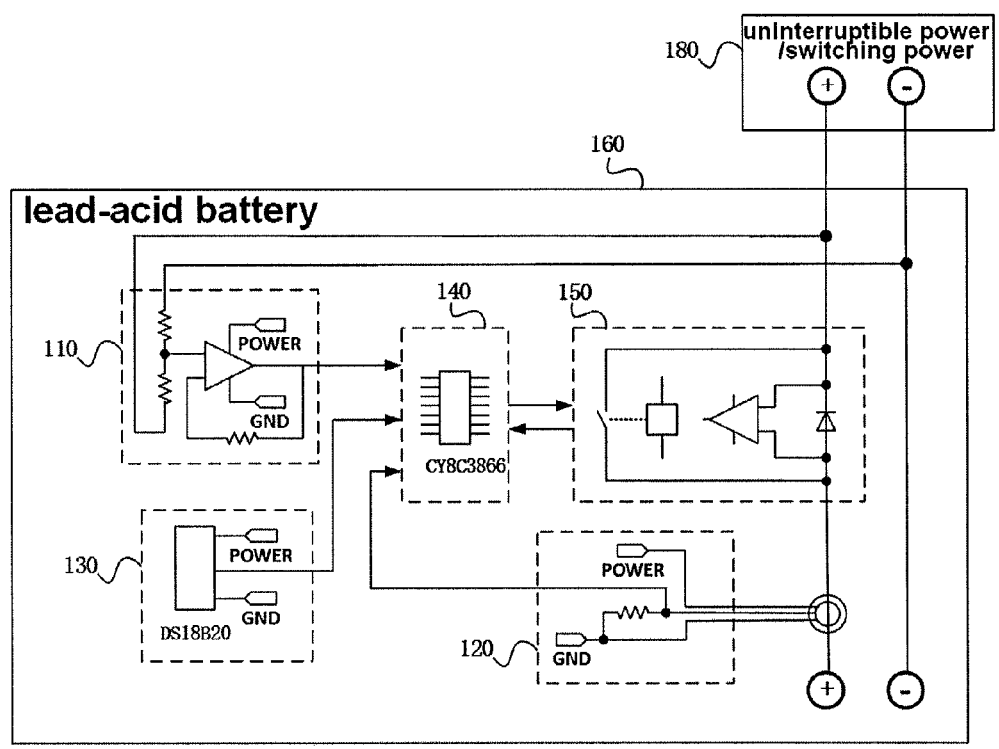
FIG. 6 is a structure diagram of a charge and discharge control device in another embodiment of the present application.

The voltage acquisition unit 110 is used to collect the voltage of the lead-acid battery 160. In a preferred embodiment, as shown in FIG. 6, the voltage acquisition unit 110 is connected in parallel with the charge and discharge loop of the lead-acid battery 160, collects the voltage of the lead-acid battery 160 in a form of dividing resistor and operational conditioning circuit and the collected voltage error is less than 0.2%.

The current acquisition unit 120 is used to collect the current of lead-acid battery 160. In a preferred embodiment, the current acquisition unit 120 uses the structure of the structure of Hall sensor and divider connected in series to the charge and discharge of the lead-acid battery 160, then achieves the conversion between current and voltage by the resistor to complete the collecting of the current of the lea-acid battery 160 and the collected current error is less than 1%.

The temperature acquisition unit 130 is disposed in the lead-acid battery 160, used to collect the internal temperature of the lead-acid battery 160; In a preferred embodiment, the temperature acquisition unit 130 uses the temperature chip of DS18B20 type.

The servo unit 150 is used to connect and disconnect the charge and discharge loop of the lead-acid battery 160 and feedback the on-off state of charge and discharge loop of the lead-acid battery 160 to the processor unit 140. In a preferred embodiment, the servo unit 150 comprises parallel freewheeling diode and on-off switch, the freewheeling diode is used to instantly connect the discharge loop of the lead-acid battery 160 when the AC is disconnected, the on-off switch is used to close/connect when disconnecting/disconnect the charge loop of the lead-acid battery 160 and feedback the on-off state of the charge and discharge loop to the processor unit 140. In a detailed embodiment, the on-off switch is a DC contactor with large current and low impedance and the freewheeling diode is rectifier diode with large current. The DC contactor disconnects or closes the charge and discharge loop of the lead-acid battery 160 in respond to the control commands of the processor unit 140, the auxiliary contact of the DC contactor will feed back the on-off status of the charge and discharge loop of the lead-acid battery 160 to the processor unit 140 when the DC contactor disconnects or closes the charge and discharge loop of the lead-acid battery 160. The rectifier diode with large current will be instantly connected due to the voltage difference across both ends thereof when the AC is disconnected or switched off, thus allowing the lea-acid battery 160 to discharge to the outside to supply power. After the rectifier diode with large current is connected, the servo unit 150 can close the DC contactor within 0.5 seconds processed by hardware or by software, so that the discharge loop of the lead-acid battery 160 is connected to guarantee the lead-acid battery 160 continuously and normally supplies power, thus the servo unit 150 can instantly connect the discharge loop of the lead-acid battery 160 when the AC is disconnected to allow the lead-acid battery 160 to seamlessly discharge. Of course, after the rectifier diode with large current is connected, the servo unit 150 can detect whether the lead-acid battery 160 is in the discharged state or not (such as whether the DC contactor is closed or not), when detecting the lead-acid battery 160 is in the discharged state and the DC contactor is in the closed state, then the servo unit 150 needs not to control the DC contactor to be closed; when the DC contactor is in the off-state, then the servo unit 150 needs to control the DC contactor to be closed.

The processor unit 140 is electrically connected with the voltage acquisition unit 110, current acquisition unit 120, temperature acquisition unit 130 and servo unit 150, respectively. The processor unit is used to acquire the voltage, current and internal temperature of the lead-acid battery 160 collected by the voltage acquisition unit 110, current acquisition unit 120 and temperature acquisition unit 130; the processor unit 10 is also used to acquire the on-off state of the charge and discharge loop of the lead-acid battery 160 in real time fed back by the servo unit 150, and calculate or record the time of duration of connecting and disconnecting the charge loop according to the on-off state of the charge and discharge loop of the lead-acid battery 160 in real time fed back by the servo unit 150, and the time of duration of connecting and disconnecting the charge loop can be used to represent the time of being continuously charged and the time of not being continuously charged, respectively. The processor unit 140 controls the servo unit to connect or disconnect the charge and discharge loop of the lead-acid battery 160 according to the acquired voltage, current, internal temperature, on-off state of the charge and discharge and time of duration of connecting and disconnecting the charge loop of the lead-acid battery 160. In a detailed embodiment, the processor unit 140 controls the servo unit 150 to disconnect the charge loop of the lead-acid battery 160 to allow the lead-acid battery 160 to be in not charging state when the acquired temperature is greater than the first temperature threshold and the charge current is less than the first current threshold, and herein the lead-acid battery 160 can be determined to be in a float charge state by using the fact that the charge current is less than the first current threshold; controls the servo unit 150 to disconnect the charge loop of the lead-acid battery 160 when the time of duration of connecting the charge loop is greater than the first time threshold and the acquired current is less than the second current threshold; and controls the servo unit 150 to connect the charge loop of the lead-acid battery 160 when the time of duration of disconnecting the charge loop is greater than the second time threshold or the acquired voltage is less than the first voltage threshold. In other embodiments, the processor unit 140 also can control the servo unit 150 to disconnect the charge loop of the lead-acid battery 160 when the acquired temperature is greater than the first temperature threshold. In the embodiment, the first temperature threshold is 45 degree centigrade, the first current threshold is 0.05 C, the second current threshold is 0.01 C, the first time threshold is 1 hour, the second time threshold is 23 hours, the first voltage threshold is 2.17V, and herein the first voltage threshold of 2.17V is for the cell lead-acid battery (the rated voltage is 2V) and it should be noted that, the above first temperature threshold, first current threshold, second current threshold, first voltage threshold, first time threshold, second time threshold, etc. can be adjusted and modified in the processor unit 140 according to the actual situations. In a preferred embodiment, the processor unit 140 uses single-chip microcomputer with low consumption of CY8C3866 type.

The foregoing is the description of the structure and operation principle of the charge and discharge control device and intelligent battery of the present application. Accordingly, the present application further discloses a method of controlling charge and discharge.

The method of controlling charge and discharge of the present application collects the voltage, current and internal temperature of the lead-acid battery 160 in real time, acquires the on-off state of the charge and discharge loop of the lead-acid battery 160 in real time, and calculates the time of duration of the charge and discharge of the lead-acid battery 160 according to the on-off state of the charge and discharge; and controls the connecting or disconnecting of the charge and discharge loop of the lead-acid battery 160 according to the collected and acquired voltage, current, internal temperature, on-off state of the charge and discharge loop and time of duration of connecting and disconnecting the charge loop of the above lead-acid battery 160 at the same time. In a preferred embodiment, the charge loop of the lead-acid battery 160 is controlled to be disconnected when the collected temperature is greater than the first temperature threshold and the charge current is less than the first current threshold; the charge loop of the lead-acid battery 160 is controlled to be disconnected when the time of the duration of connecting the charge loop is greater than the first time threshold and the collected current is less than the second current threshold; the charge loop of the lead-acid battery 160 is controlled to be connected when the time of the duration of disconnecting the charge loop is greater than the second time threshold or the collected voltage is less than the first voltage threshold. In other embodiments, the charge loop of the lead-acid battery 160 is controlled to be disconnected when the acquired temperature is greater than the first temperature threshold. In the embodiment, the first temperature threshold is 45 degree centigrade, the first current threshold is 0.05 C, the second current threshold is 0.01 C, the first time threshold is 1 hour, the second time threshold is 23 hours, the first voltage threshold is 2.17V, and herein the first voltage threshold of 2.17V is for the cell lead-acid battery (the rated voltage is 2V) and the above first temperature threshold, first current threshold, second current threshold, first voltage threshold, first time threshold, second time threshold, etc. can be adjusted and modified according to the actual situations. In an actual situation, the first current threshold can be greater or less than the second current threshold and the first current threshold can also be equal to the second current threshold as required.

Figure 7:
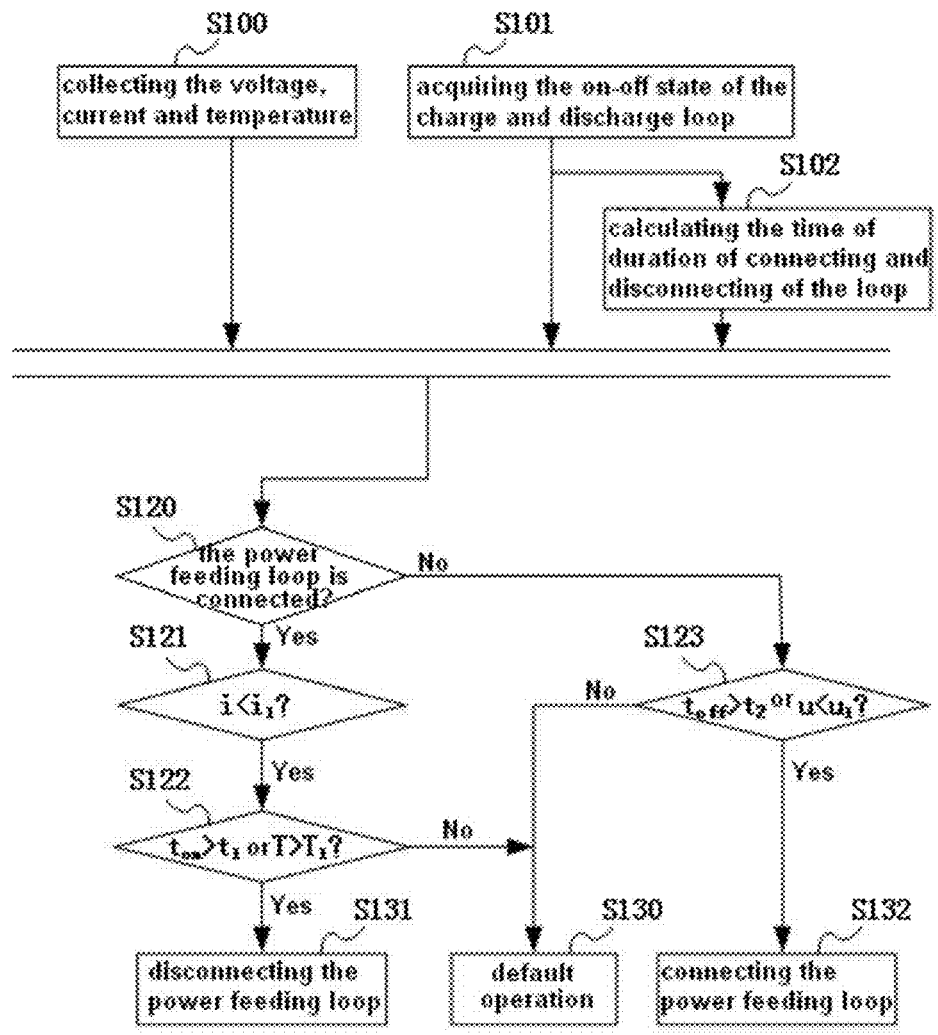
FIG. 7 is a flowchart of a charge and discharge control means in still another embodiment of the present application.

In a detailed embodiment, let the first current threshold be equal to the second current threshold, please refer to FIG. 7, the method of controlling the charge and discharge comprises the following steps:

Step S100, collecting the voltage u, current i and internal temperature T of the lead-acid battery 160.

Step S101, acquiring the on-off state of the charge and discharge loop of the lead-acid battery 160, specifically, acquiring the charge loop of the lead-acid battery 160 is in on state or off state.

Step S102, calculating the time of duration of connecting the charge loop of the lead-acid battery 160 ton and the time of duration of disconnecting toff according to the on-off state of the charge and discharge loop of the lead-acid battery 160. In a detailed embodiment, firstly, the initialization is performed and both the time of duration of connecting and disconnecting the charge loop ton and toff are set to 0, and the on-off state of the charge loop of the lead-acid battery 160 is acquired, if acquiring the charge loop is in the connected state at the moment, then the time of duration of connecting the charge loop ton starts timing; if acquiring the charge loop is in the disconnected state at the moment, then the time of duration of disconnecting the charge loop toff starts timing. When acquiring the charge loop is in the connected state last moment and acquiring the charge loop is still in the connected state next moment, then the time of duration of connecting the charge loop ton continues timing; when acquiring the charge loop is in the connected state last moment and acquiring the charge loop is in the disconnected state next moment, then the time of duration of connecting the charge loop ton is cleared and the time of duration of disconnecting the charge loop toff starts timing. Likewise, acquiring the charge loop is in the disconnected state last moment and acquiring the charge loop is still in the disconnected state next moment, then the time of duration of disconnecting the charge loop toff continues timing; when acquiring the charge loop is in the disconnected state last moment and acquiring the charge loop is in the connected state next moment, then the time of duration of disconnecting the charge loop toff is cleared and the time of duration of connecting the charge loop toff starts timing.

Step S120, determining the on-off state of the charge loop of the lead-acid battery 160, if the charge loop of the lead-acid battery 160 is in on state, then performing the step S121; otherwise, if the lead-acid battery 160 is in off state, then performing the step S123.

Step S121, determining whether the current i of the lead-acid battery 160 is less than the current threshold i1 or not, if the current i of the lead-acid battery 160 is less than the current threshold i1, then performing the step S122; otherwise, if the current i of the lead-acid battery 160 is not less than the current threshold i1, then performing the step S130.

Step S122, determining the time of duration of connecting the charge loop of the lead-acid battery 160 ton is greater than the first threshold t1 or not, or the collected internal temperature of the lead-acid battery 160 T is greater than the first temperature threshold T1 or not, if the time of duration of connecting the charge loop of the lead-acid battery 160 ton is greater than the first threshold t1 or the collected internal temperature of the lead-acid battery 160 T is greater than the first temperature threshold T1, then performing the step S131 and disconnecting the charge loop of the lead-acid battery 160; otherwise, if the time of duration of connecting the charge loop of the lead-acid battery 160 ton is not greater than the first threshold t1 and the collected internal temperature of the lead-acid battery 160 T is not greater than the first temperature threshold T1, then performing the step S130.

Step S123, determining the time of duration of disconnecting the charge loop of the lead-acid battery 160 toff is greater than the second threshold t2 or not, or the voltage u of the lead-acid battery 160 is less than the first voltage threshold u1 or not, if the time of duration of disconnecting the charge loop of the lead-acid battery 160 toff is greater than the second threshold t2 or the voltage u of the lead-acid battery 160 is less than the first voltage threshold u1, then performing the step S132 and connecting the charge loop of the lead-acid battery 160; otherwise, if the time of duration of disconnecting the charge loop of the lead-acid battery 160 toff is not greater than the second threshold t2 and the voltage u of the lead-acid battery 160 is not less than the first voltage threshold u1, then performing the step S130.

Step S130, default operation, i.e. not executing any operation to maintain the original state of the charge loop of the lead-acid battery 160. After S130, S131 and S132 are performed, the operation stars from step S100 again, thus the data of the lead-acid battery 160 in running can be acquired in real time or at regular time and the charge of the lead-acid battery 160 can be connected or disconnected according to these data.

It should be noted that in the present application, when the AC is normal, the lead-acid battery is in the charged state when the charge loop is connected of the lead-acid battery 160, the lead-acid battery 160 is in the not charged state when the charge loop thereof is disconnected; likewise, when the AC is disconnected, the lead-acid battery 160 is in the discharged state to supply power when the discharge loop of the lead-acid is connected, the lead-acid battery 10 is in the not discharged state, i.e. not supply power for the outside when the discharge loop thereof is disconnected, of course, when the AC is disconnected, even if the switch of the DC contactor is off but due to the function of the freewheeling diode on the hardware, the discharge circuit is actually not disconnected, thus the power supply of the lead-acid battery 160 is not affected. To sum up, when the AC is normal, the lead-acid battery 160 needs not to discharge to supply power for the outside, but need to charge to keep full charged, thus the charge loop of the lead-acid battery 160 is connected at the moment, during the period, in order to avoid the long-term overcharge and high-temperature charge, etc., the present application controls the connecting and disconnecting of the charge loop according to the acquired voltage, current, internal temperature, on-off state of the charge loop and time of duration of connecting and disconnecting the charge loop of the lead-acid battery 160.

If the lead-acid battery 160 is in a continuous float charge state for a long time, the gird of the lead-acid battery 160 is continuously etched and the interior of the lead-acid battery 160 is continuously dehydrated, further the service life of the lead-acid battery 160 is shorten, and the lead-acid battery 160 is charged under the high temperature condition, which will further accelerates the aging of the lead-acid battery 160 and shorten the service life of the lead-acid battery 160. While the charge and discharge control device, method and intelligent battery disclosed by the present application achieves the intermittently charging of the lead-acid battery 160, avoids the long-term overcharge and high-temperature charge, etc. of the lead-acid battery 160 and efficiently lengthens the service life of the lead-acid battery 160 by collecting the parameters of the lead-acid battery 160 in running, and the parameters not only comprise the current, voltage and also comprise the internal temperature of the lead-acid battery 160 and the time of duration of connecting and disconnecting the charge loop of the lead-acid battery 160.

The foregoing uses particular examples to explain the present invention and is only to help in understanding the present invention and are not limiting of the present invention. Modifications can be made to the above specific implementations by those skilled in the art according to the concept of the present invention.

What is claimed is:

1. A charge and discharge control device, used to control the intermittently charging of a lead-acid battery, comprising:
    a voltage acquisition unit, used to collect the voltage of the lead-acid battery;
    a current acquisition unit, used to collect the current of the lead-acid battery;
    a temperature acquisition unit, disposed in the lead-acid battery, used to collect the temperature of the lead-acid battery;
    a servo unit, used to connect and disconnect the charge and discharge loop of the lead-acid battery and feedback the on-off state of charge and discharge loop of the lead-acid battery; and
    a processor unit, electrically connected with the voltage acquisition unit, current acquisition unit, temperature acquisition unit and servo unit, the processor unit calculates the time of duration of connecting and disconnecting of the charge loop of the lead-acid battery according to the on-off state of the charge and discharge loop of the lead-acid battery fed back by the servo unit;
    the processor unit controls the servo unit to connect or disconnect the charge and discharge loop of the lead-acid battery according to the collected voltage, current, temperature and the on-off state of the charge and discharge loop of the lead-acid battery and the time of duration of the connecting and disconnecting of the charge loop fed back by the servo unit.

2. The charge and discharge control device of claim 1, wherein the processor unit:
    controls the servo unit to disconnect the charge loop of the lead-acid battery, when the collected temperature is greater than the first temperature threshold and the charge current is less than the first current threshold;
    controls the servo unit to disconnect the charge loop of the lead-acid battery, when the time of duration of connecting the charge loop is greater than the first time threshold and the collected current is less than the second current threshold; and
    controls the servo unit to connect the charge loop of the lead-acid battery, when the time of duration of disconnecting the charge loop is greater than the second time threshold or the collected voltage is less than the first voltage threshold.

3. The charge and discharge control device of claim 1, wherein the lead-acid battery is used to supply power for the UPS power or the switching power when the AC is disconnected, wherein the servo unit instantly connects the discharge loop of the lead-acid battery when AC is disconnected.

4. The charge and discharge control device of claim 3, wherein the servo unit comprises a parallel freewheeling diode and on-off switch, the freewheeling diode is used to instantly connect the discharge loop of the lead-acid battery when the AC is disconnected, the on-off switch is used to close/connect when disconnecting/disconnect the charge loop of the lead-acid battery and feedback the on-off state of the charge and discharge loop to the processor unit.

* * * * *